US008608210B2

(12) United States Patent
Kainec (10) Patent No.: US 8,608,210 B2
(45) Date of Patent: Dec. 17, 2013

(54) COUPLING DEVICE FOR TUBULAR MEMBERS

(75) Inventor: Keith D. Kainec, Sagamore Hills, OH (US)

(73) Assignee: Insight Engineering Services, Inc., Sagamore Hills, OH (US)

( * ) Notice: Subject to any disclaimer, the term of this patent is extended or adjusted under 35 U.S.C. 154(b) by 306 days.

(21) Appl. No.: 12/722,660

(22) Filed: Mar. 12, 2010

(65) Prior Publication Data

US 2010/0171309 A1 Jul. 8, 2010

Related U.S. Application Data

(63) Continuation-in-part of application No. 11/850,797, filed on Sep. 6, 2007, now Pat. No. 7,900,976.

(51) Int. Cl.
*F16L 19/08* (2006.01)

(52) U.S. Cl.
USPC .................. 285/343; 285/348; 285/382.7

(58) Field of Classification Search
USPC ............... 285/339, 341, 342, 343, 348, 354, 285/382.7
See application file for complete search history.

(56) References Cited

U.S. PATENT DOCUMENTS

| 2,100,796 | A | 11/1937 | Church |
| 2,250,477 | A | 7/1941 | Fleischman |
| 2,394,351 | A | 2/1946 | Wurzburger |
| 2,536,745 | A | 1/1951 | Herold |
| 2,645,099 | A | 7/1953 | Cumming |
| 2,687,906 | A | 8/1954 | Schnell |
| 2,693,374 | A | 11/1954 | Wurzburger |
| 2,693,377 | A | 11/1954 | Wurzburger |
| 2,701,149 | A | 2/1955 | Kreidel et al. |
| 2,749,152 | A | 6/1956 | Courtot |
| 3,075,793 | A | 1/1963 | Lennon et al. |
| 3,112,131 | A | 11/1963 | Campbell |
| 3,201,153 | A | 8/1965 | Currie |
| 3,375,026 | A | 3/1968 | Szohatzky |
| 3,379,461 | A | 4/1968 | Davis |
| 3,393,931 | A | 7/1968 | Wurzburger |
| 3,584,900 | A | 6/1971 | Lennon et al. |
| 3,736,008 | A | 5/1973 | Crawford |
| 3,893,716 | A | 7/1975 | Moreiras et al. |
| 4,586,731 | A | 5/1986 | Castrup |
| 4,740,019 | A | 4/1988 | Casimir et al. |
| 4,826,218 | A | 5/1989 | Zahuranec |

(Continued)

FOREIGN PATENT DOCUMENTS

KR 2019960004035 U 2/1996

OTHER PUBLICATIONS

International Search Report and Written Opinion of the International Searching Authority, PCT/US2008/075379, filed Sep. 5, 2008.

*Primary Examiner* — James Hewitt
(74) *Attorney, Agent, or Firm* — Pearne & Gordon LLP (57) ABSTRACT

A coupling device includes a coupling body and a collar adapted to engage a tubular member in a fluid tight seal. The coupling device includes axially spaced front and back ferrules which engage during mounting to provide a plurality of seals intermediate the ferrules and the tubular member as well as the coupling body. The back ferrule includes a generally cylindrical or tubular wall that is elastically/plastically deformed to an arcuate shape to enhance the maintenance of the seals.

8 Claims, 5 Drawing Sheets

(56) References Cited

U.S. PATENT DOCUMENTS

| | | | |
|---|---|---|---|
| 4,915,427 | A * | 4/1990 | Zahuranec .................... 285/342 |
| 5,069,058 | A | 12/1991 | Hyatt |
| 5,261,638 | A | 11/1993 | Onishi et al. |
| 5,452,921 | A | 9/1995 | Hyatt et al. |
| 5,882,050 | A | 3/1999 | Williams et al. |
| 6,345,845 | B2 | 2/2002 | Johnston |
| 6,517,126 | B1 | 2/2003 | Peterson et al. |
| 6,575,501 | B1 | 6/2003 | Loy, Jr. |
| 6,629,708 | B2 | 10/2003 | Williams et al. |
| 6,766,582 | B2 | 7/2004 | Williams et al. |
| 6,851,729 | B2 | 2/2005 | Gibson |
| 6,941,668 | B2 | 9/2005 | Williams et al. |
| 7,125,055 | B2 | 10/2006 | Dallas |
| 7,900,976 | B2 * | 3/2011 | Kainec .......................... 285/343 |
| 2002/0113438 | A1 | 8/2002 | Lynn et al. |
| 2007/0164563 | A1* | 7/2007 | Arstein et al. ................. 285/249 |
| 2010/0090457 | A1* | 4/2010 | Nakata et al. .................... 285/24 |

* cited by examiner

COUPLING DEVICE FOR TUBULAR MEMBERS

This application is a continuation-in-part of application Ser. No. 11/850,797, filed Sep. 6, 2007, now U.S. Pat. No. 7,900,976.

BACKGROUND OF THE INVENTION AND RELATED ART

This invention pertains to the art of coupling devices and more particularly to an improved sealing and gripping device.

The invention is particularly applicable to a tube coupling arrangement and will be described with particular reference thereto. However, it will be appreciated that the invention has broader applications and may be advantageously employed for other uses in a variety of environments.

Fittings are commonly used to connect metal tubes and pipes to each other for use in a variety of applications, such as in the aerospace industry, to convey fuel, hydraulic control fluids, and the like in an aircraft or space vehicle. In these applications, it is critical that there be a secure connection between the coupling body and the tubes in order to withstand vibration and other adverse conditions without failure.

The fittings may be installed by a mechanical engagement or by threaded engagement. A mechanical engagement may include swaged and pressed fitted components which typically cannot be disassembled without destroying the fitting and/or tube. The threaded engagement of the fitting components enables their disassembly and reassembly to again form a fluid tight seal.

Of particular interest herein are more severe applications wherein seals for fluids and gases must be maintained under extreme conditions. For example, so-called high pressures applications at pressures in excess of 1000 psi and/or high temperatures. Even under these extreme conditions, it is necessary that acceptable seals be reproducibly formed and maintained. Less severe typical applications include automotive air-conditioning systems, oxygen systems in hospitals, instrumentation fittings for natural gas wells, and compressed hydrogen systems used in fuel cells or combustion engines.

The use of swaging to secure fittings to tubular members is known. The fittings and coupling elements may be secured to the tubular member by the direct application of radial forces to deform the tube inwardly and provide a swaged connection. U.S. Pat. No. 5,069,058 discloses a tool for providing such a swaged connection.

Axially swaged fittings including a sleeve surrounded by a deforming ring are also known. For example, U.S. Pat. No. 5,452,921 discloses such an arrangement. Related axially swaged fittings are shown in U.S. Pat. Nos. 6,517,126 and 3,375,026.

SUMMARY OF THE INVENTION

A coupling device is provided including a coupling body and a collar adapted to engage a tubular member in a fluid tight seal. The coupling device includes axially spaced front and back ferrules which engage during mounting to provide a plurality of seals intermediate the ferrules and the tubular member as well as the coupling body.

The back ferrule includes a forward region connected by a central region to a rearward region. The shape of the ferrule is changed as the coupling device is mounted or swaged to the tubular member in a fluid tight seal. More particularly, a generally cylindrical or tubular wall in one region of the back ferrule is elastically/plastically deformed to a shape that enhances the maintenance of the seals formed by the ferrules and coupling member with the tubular member.

The increasing load on the coupling device and the progressive collapse of the region of the back ferrule is believed to slowly seat the components and increase the accuracy of the axial alignment. The continued collapse of the region of the back ferrule with increasing axial loads thereafter seals the coupling device and the tubular member in their final thread mounted or swaged condition.

DETAILED DESCRIPTION OF THE INVENTION

Figure 1:
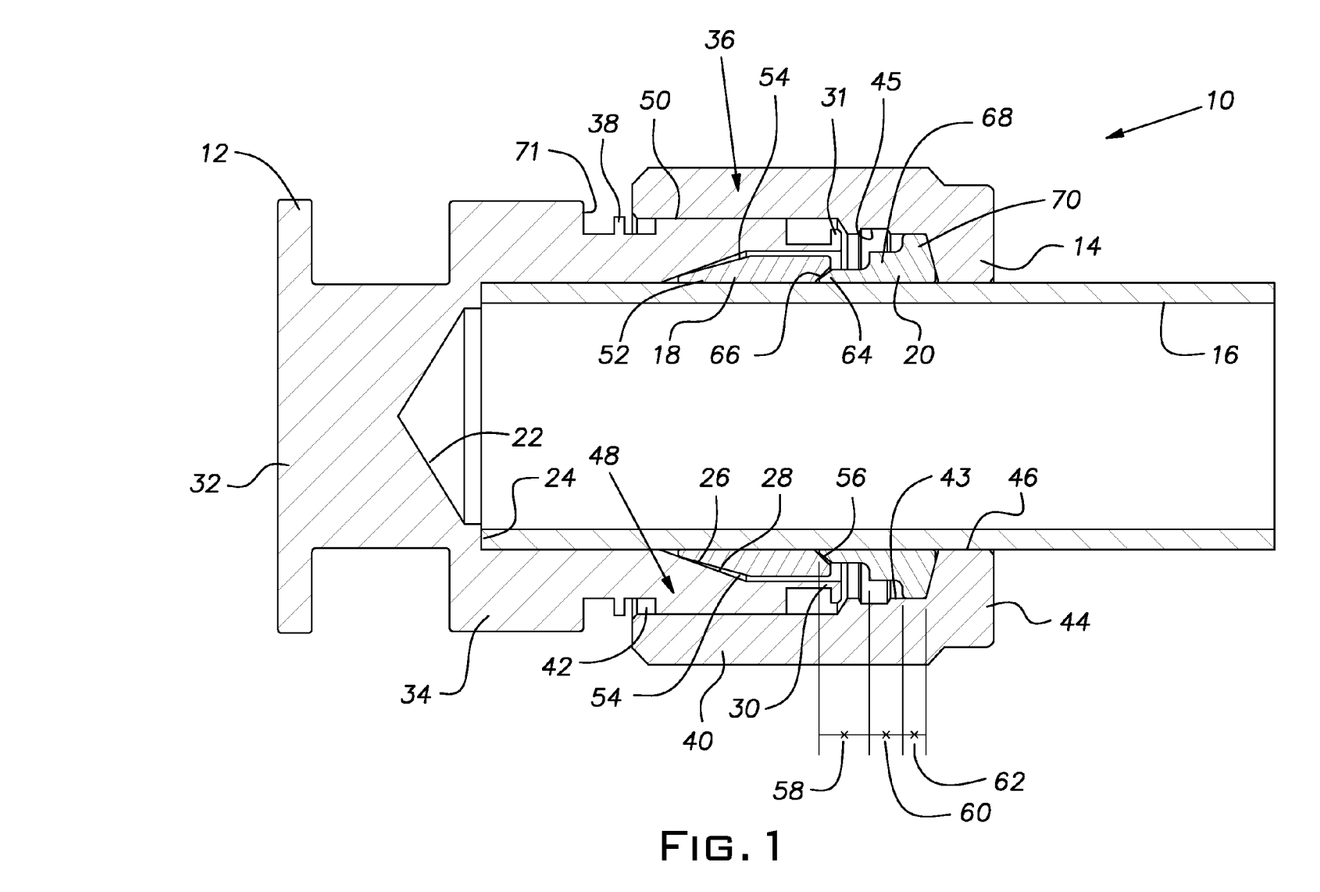
FIG. 1 is a cross-sectional elevational view of a first embodiment of a coupling device preassembled to a tubular member in preparation for swaging in accordance with the invention.
Figure 2:
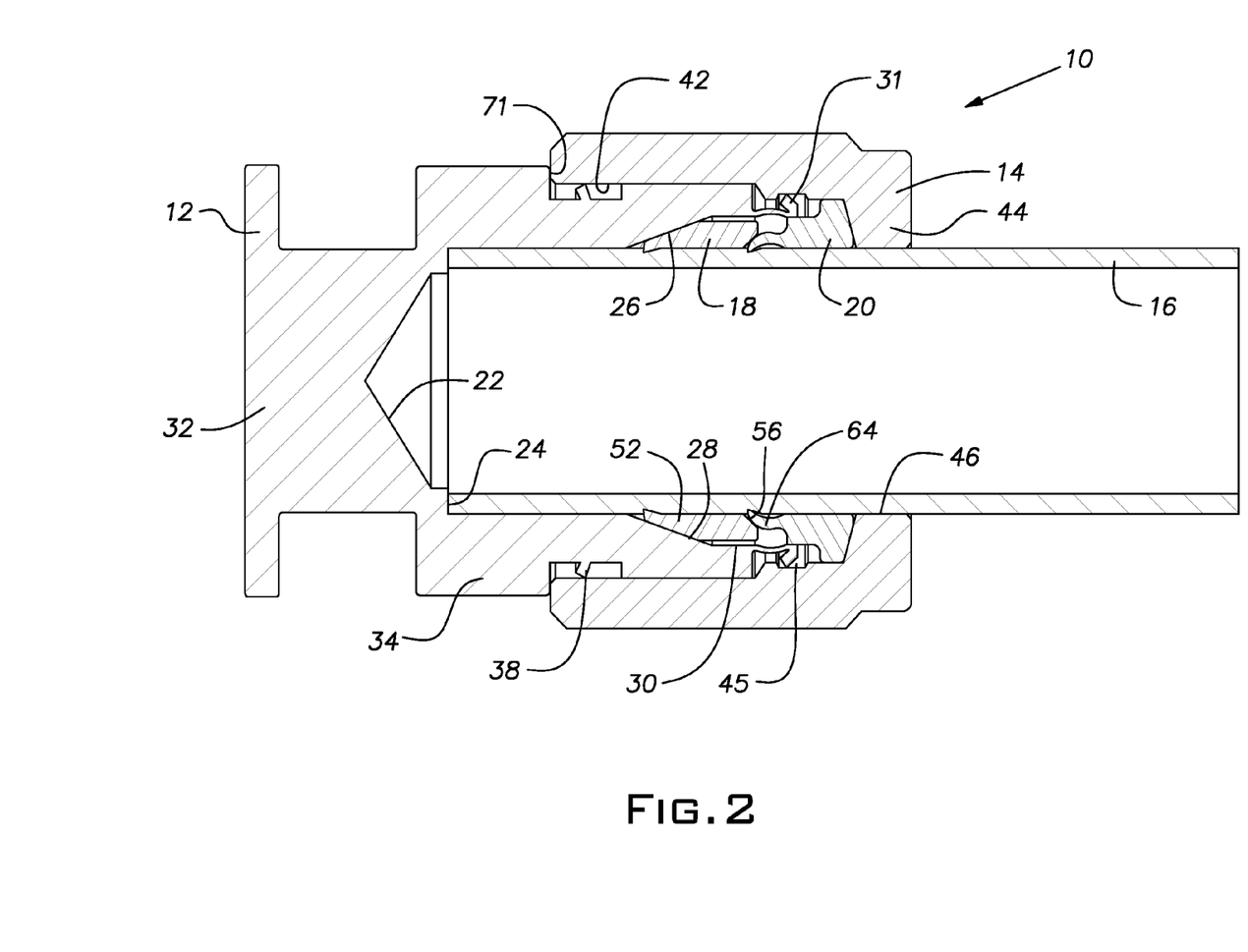
FIG. 2 is a cross-sectional view of the coupling device of FIG. 1, showing the coupling device and the tubular member after the swaging operation has been completed.

Referring to FIGS. 1 and 2, a coupling device 10 includes a coupling body 12 and a collar 14. The coupling device is shown preassembled to a tubular member 16 comprising a tube. The coupling device 10 also includes a front ferrule 18 and a back ferrule 20.

The coupling body 12 is a cap, but the coupling body may take any number of forms, such as a male threaded fitting, a female threaded fitting, a union, a tee, a cross or an elbow. Further, the coupling member may be provided directly on a valve, filter, instrument or the like.

The cap 12 includes a blind bore 22 for receiving the end of the tube 16 that is to be closed; however, other coupling bodies may include a through bore or passage for receipt of the tube 16. In all cases, the bore 22 or a through passage has an inner diameter comparable to the outer diameter of the tube 16. Here, the bore 22 has a shoulder 24 against which the end of the tube 16 is seated during preassembly for swaging.

The bore 22 includes a counterbore 26 at the open or rearward end of the bore. The counterbore 26 includes a tapered camming mouth providing a frusto-conical camming surface 28. The camming surface 28 extends to a generally cylindrical portion 30 adjacent to the open end of the counterbore 26. The portion 30 includes a deformable bearing and locking ring 31 having the shape of annular radially outward extending shoulder.

The coupling body 12 includes a closed forward end wall 32 and a generally cylindrical body portion 34. Extending along a rearward portion of the periphery of the body portion 34 is an interlocking or engagement section 36 including a locking ring 38. As explained in more detail below, the engagement section 36 is adapted to form a press fit with the collar 14 as well as to deform and interlock with the bearing and locking ring 31.

The collar 14 has a generally cylindrical body 40 surrounding an opening or bore 42 at its forward end. The opening 42 extends rearward to a cylindrical portion of reduced diameter 43 and terminates at an annular wall 44 adjacent the rearward end of the collar 14. The reduced diameter portion 43 deforms the ring 31 during axial engagement of the components. An annular recess 45 is provided in the wall of the reduced diameter portion 43 to receive the deformed ring 31. The wall 44 forms a through passage 46 having an inner diameter comparable to the outer diameter of the tube 16.

An interlocking or engagement section 48 extends along a forward portion of the periphery of the interior surface of the opening 42. The engagement section 48 has an inner diameter sized to interfere with the outer diameter of the locking ring 38. Accordingly, upon axial engagement of the coupling body 12 within the opening 42 in the collar 14, the rings 31 and 38 plastically deform to permanently lock the components together and a press fit is provided between the adjacent surface of the opening 42 and the surface 50.

The front ferrule 18 and the back ferrule 20, in their original conformations prior to swaging, each have an inner diameter dimensioned to closely, but freely, receive the tube 16 therethrough. The ferrules and components of the coupling device 10 are typically formed of sufficiently hard materials to assure deformation and formation of seals with the tube. The materials used to form the coupling device range from metal to plastic. Typical materials include 316 stainless steel, steel, high temperature nickel alloys such as Inconel®, other corrosion resistant materials such as Monel® and Hastelloy®, and brass.

The ferrule 18 includes a nose portion 52 having a frusto-conically shaped surface 54 for engagement with the camming surface 28. The ferrule 18 also includes a rearward, tapered internal surface 56 for engagement with the ferrule 20 as described below.

The ferrule 20 has a stepped shape including a forward region 58, a central region 60 and a rearward region 62. The axial length of the forward region 58 is about 50% of the total length of the ferrule. In the illustrated embodiment, the ferrule 20 is formed of 316 stainless steel.

The forward region 58 includes a nose 64 having a cylindrical or tubular shape extending to a frusto-conically shaped surface 66 arranged for engagement with the camming surface 56 of the front ferrule 18. The wall thickness of the forward region should be less than the wall thickness of the adjacent regions. In general, the wall thickness of the forward region should be from about 20% to about 50% of the wall thicknesses of each of the central and rearward regions.

The central region 60 has a cylindrical shape and includes a first stepped bearing portion 68 that cooperates with the bearing and locking ring 31 as described below.

In the illustrated embodiment, the wall thickness of the stepped portion 68 is about twice the wall thickness of the forward region. The wall thicknesses may be further varied in accordance with the teachings herein.

The rearward region 62 includes a second stepped bearing portion 70. The bearing portion 70 has an outer diameter sized for radial bearing support against the inner surface of the reduced diameter cylindrical portion 43 of the opening or bore 42.

The axial overlap achieved upon engagement of the interlocking sections 36 and 48 is limited by contact of the forward axial end of the collar 14 with an annular shoulder 71 on the coupling body 12. (FIG. 2) The axial overlap assures collapse of the nose 64 in the forward region 58 to a deformed or collapsed shape having a wall profile in axial section that is generally arcuate. In accordance with the materials employed and the application seal requirements, the axial length of the nose 64 may be reduced upon collapse by 10% to 25%, or more typically, from about 15% to 20%.

For purposes of installing the coupling device 10, the coupling body 12, collar 14, front ferrule 18 and back ferrule 20 are preassembled in axial alignment on the tube 16 as shown in FIG. 1. The body 12 and collar 14 are then axially loaded and biased together. In the illustrated embodiment, the forward or closing movement of the coupling body 12 is provided by the advance of the annular wall 44 against the second stepped bearing portion 70. The installation may be provided by a suitable swaging tool as disclosed in U.S. Pat. No. 5,069,058 or in application Ser. No. 11/850,797, filed Sep. 6, 2007, now U.S. Pat. No. 7,900,976, and owned by the assignee of this application, or by other swaging tools as knew known in the art.

During initial loading, the frusto-conically shaped surface 66 of the nose 64 of the rear ferrule 20 is biased against the tapered internal surface 56 of the front ferrule 18. In turn, the frusto-conically shaped surface 54 of the nose 52 of the front ferrule 18 is biased against the camming mouth or surface 28 of the counter bore 26. In this manner, the front ferrule is seated slowly and accurately.

The cylindrical or tubular configuration of the forward region 58 initially resists buckling as seating of the ferrules progresses and then proceeds to buckle with sealing and swaging of the coupling device. Upon swaging, the ferrule deformation of the tube surface or "bite" increases in depth with decreasing ferrule wall thickness in the forward region 58.

Figure 3:
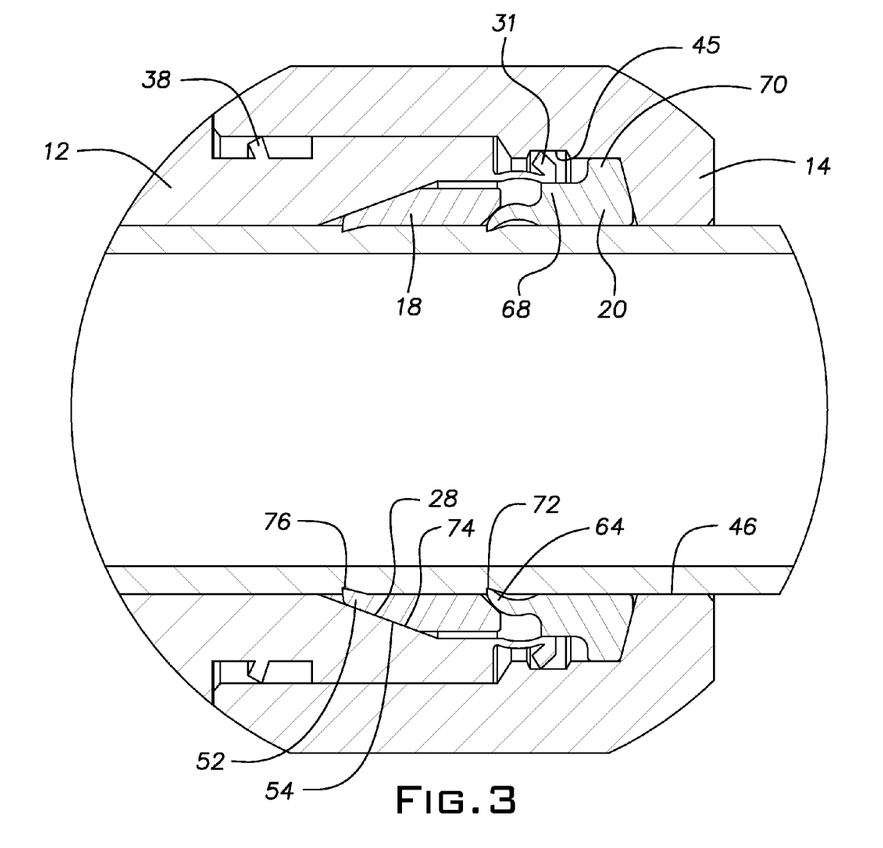
FIG. 3 is a fragmentary cross-sectional view on an enlarged scale of a portion of the coupling device and tubular member shown in FIG. 2.

Referring to FIGS. 2 and 3, the coupling device 10 is shown fully swaged to the tube 10. In this condition, the nose 64 has been deformed into an arcuate shape or configuration which may be characterized as an annular arcuate shape bulge in the wall of the cylindrical or tubular shaped nose. This deformed shape is imparted with and retains sufficient elasticity, and acts as a spring, which assists in maintaining the back ferrule and the front ferrule bite or seal, and thereby overcomes the spring back of the metal after the removal of the axial or pull-up load. The spring function is advantageous but not necessary to the invention.

During the axial displacement of the swaging process, the bearing and locking ring 31 is initially deflected radially inward and deformed by the forward edge of the reduced diameter portion 43. The ring shoulder portion is folded over on itself about its entire annular extent. Upon continued axial displacement, the deformed ring 31 is then biased into the recess 45 by the first stepped bearing portion 68. The deformed ring 31 is biased into the recess 45 and held tightly in place by the adjacent surface of the bearing portion 68. The deformed ring 31 provides a bearing against which the bearing portion 68 works. At the same time, the second stepped bearing portion 70 is radially restrained by the adjacent bearing surface provided by the reduced diameter portion 43 to maintain the concentricity of the components. In this manner, the portions 68 and 70 provide twin bearing surfaces on the back ferrule 20.

In the absence of the twin bearing surface arrangement, it has been found that the back ferrule has a tendency to tip or cock to one side of the tubing. If the back ferrule tips or cocks during the axial displacement or pull-up, a concentric seal is not maintained and a leak path may develop.

The tipping of the back ferrule can be measured by the bite depth at spaced locations around the tube. In absence of twin bearing surfaces, it not unusual to find different bite depths at 180° locations in the order of several thousandths of an inch, e.g., a 0.006" bite depth may be found on one side of the tube and a 0.002" bite depth may be found on the other side of the tube. This is believed to be the direct result of the back ferrule tipping or cocking during pull-up.

Accordingly, the twin bearings maintain the concentricity of the back ferrule and improve the axial alignment of the front and back ferrules with the tube and the adjacent surfaces of the coupling device is maintained. In this manner, a more reliable and reproducible fluid tight seal is established and an enhanced swaged fitting is achieved.

The specific locations of seals formed in the swaged coupling device 10 are indicated in FIG. 3. Particularly, a seal 72 is formed intermediate the forward region 58 of the back ferrule 20 and the outer adjacent surface of the tube 16. A second seal 74 is formed intermediate the surface 54 of the front ferrule 18 and the adjacent surface 28 of the counterbore 26. A third seal 76 is formed nose 52 of the front ferrule 18 and the adjacent outer surface of the tube 16.

Referring to FIG. 3, the forward extremities of the ferrule noses 52 and 64 are uniformly deformed about their circular peripheries to a radially inward bite angle to form fluid tight annular seals at locations 76 and 72 with the tube 16. The thickness of the cross-section of the front region of the back ferrule has been correlated to the bite angle that is achieved. A thinner cross-section causes the nose 64 of the back ferrule 20 to buckle to a greater extent and to increase the bite angle.

The preferred bite angle is from about 2° to about 10° as measured inwardly from the outer surface of the tube 16. At angles of less than 2°, a reliable fluid tight seal is not assured. At bite angles greater than 10°, fatigue problems and possible puncture of the tube may occur.

Figure 4:
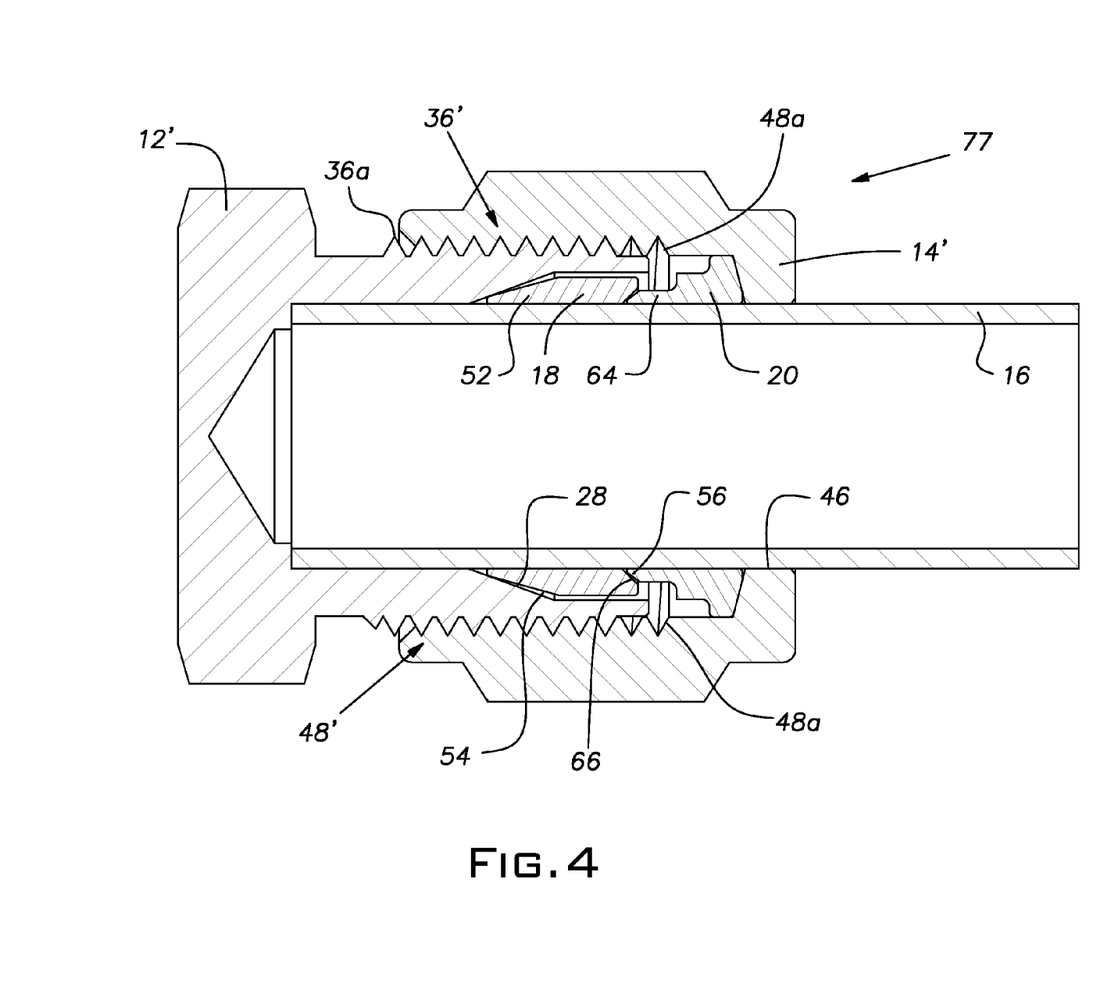
FIG. 4 is a cross-sectional elevational view showing a second embodiment of a coupling device preassembled to a tubular member in preparation for threaded engagement in accordance with the invention.

Referring to FIG. 4 a second embodiment of a coupling device in accordance with the invention is shown. For convenience, identical elements are marked with the same reference numerals as used in describing the first embodiment and modified elements are similarly numbered with the addition of a prime designation.

As shown in FIG. 4, a coupling device 77 includes a coupling body 12' and a collar 14' respectively including engagement portions 36' and 48' threadedly engaged to secure the coupling device 77 to the tube 16. More particularly, portion 36' includes male threads 36a and the portion 48' includes female threads 48a that are engageable with tool tightening, such as by a hand wrench, to mount the coupling device 77 to the tube 16 in a fluid tight seal. To that end, wrenching flats 79 (FIG. 5) may be provided on the outer peripheral surface of the coupling body 12' and the collar 14'.

Accordingly, the coupling device 77 includes a front ferrule 18 and a back ferrule 20. In this embodiment, the rings 31 and 38 are omitted and the coupling body 12' and the collar 14' are retained in position by the engagement of threads 36a and 48a in the engagement portions 36' and 48'. The ferrules 18 and 20 are mounted and operate in the same manner as described above except there is no first step bearing portion utility provided by the ferrule 20.

Figure 5:
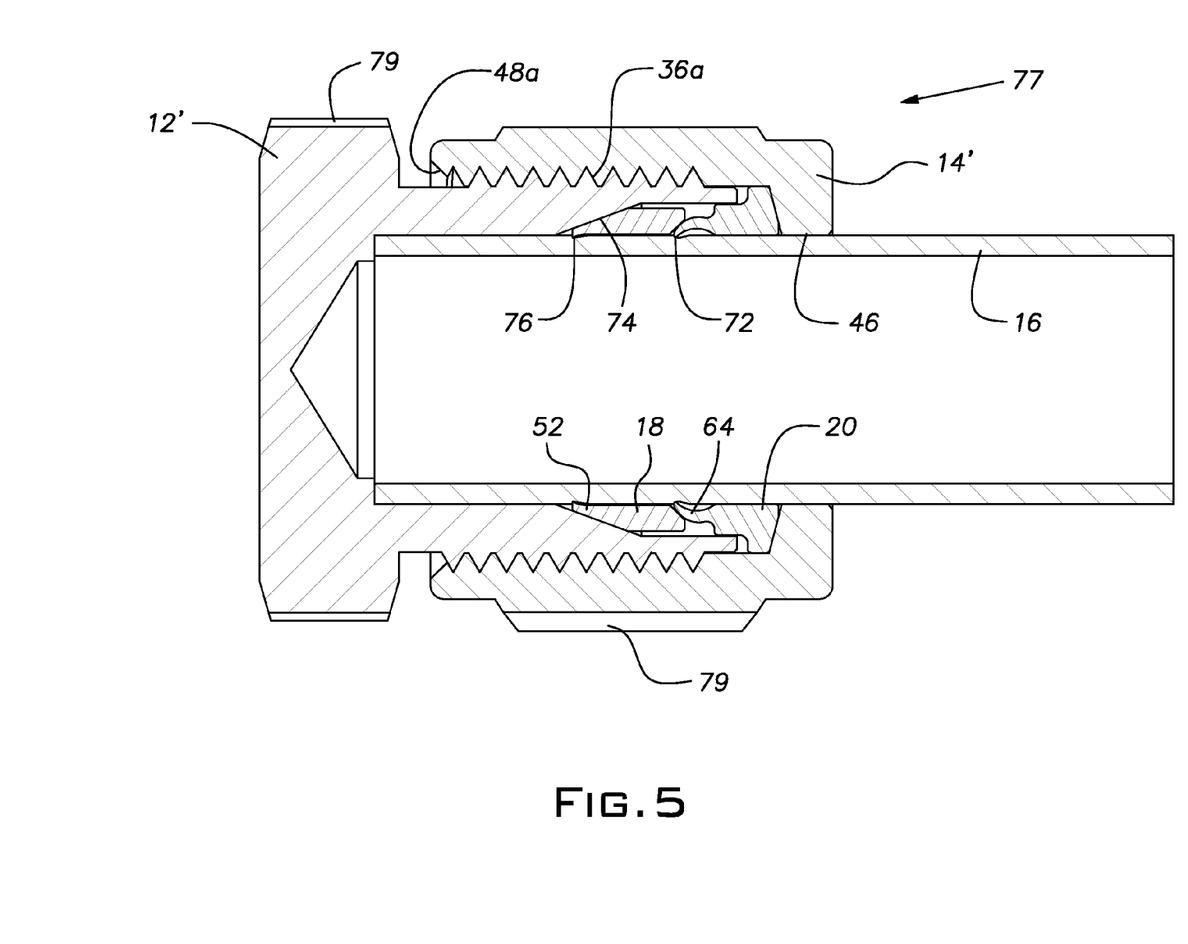
FIG. 5 is a cross-sectional view similar to FIG. 4, showing the coupling device and the tubular member after the threaded mounting operation has been completed.

Referring to FIG. 5, the coupling by the 12' and the collar 14' are fully axially engaged by threaded engagement of the engagement portions 36' and 48', and the coupling device 77 is mounted to the tube 16 with a fluid tight seal. To that end, seals are again formed at 72, 74 and 76. The noses 52 and 64 are deformed to the desired angles of engagement with the tube 16 as described above.

As also described above and shown in FIG. 5, the nose 64 is deformed to an arcuate bulged shape and applies a resilient force against the ferrule 18. This assures the maintenance of engagement of the ferrules with the tube 16 and provision of a fluid tight seal.

What is claimed is:

1. A coupling device for use with a tubular member having a generally cylindrical outer wall, said coupling device comprising:

a coupling body having an axially extending first engagement portion and an axial opening including an outer end adapted to receive said tubular member, said opening having a counterbore including an initial generally cylindrical portion forming a body bearing and locking member adjacent the outer end of the opening and extending to a generally frusto-conical camming surface tapering radially inward remote of said outer end;

a first generally annular ferrule having a tapered external surface portion engageable with said coupling body camming surface and a tapered internal surface portion;

a second generally annular ferrule including in an axial direction a forward region having a tapered external surface portion and a tubular portion, a central region having a first stepped portion and a rearward region having a second stepped portion, said tapered external surface portion of said second ferrule engaging said tapered internal surface portion of said first ferrule;

a collar having an axially extending second engagement portion for selectively engaging said first engagement portion of said coupling body and in a fully engaged position to provide a fluid tight seal between said coupling device and said tubular member, said collar also having a bore extending axially therethrough for receiving said tubular member, said bore having a reduced diameter bore portion including an internal surface for bearing engagement with said second stepped portion and an end wall for axially biasing said second ferrule toward said first ferrule;

said coupling body, collar and ferrules being sized so that upon engagement said tapered external surface portion of said second ferrule engages said tapered internal surface portion of the first ferrule, said tapered external surface portion of the first ferrule engages said camming surface of said coupling body, said first and second stepped portions of the second ferrule are respectively maintained in bearing engagement with the body bearing and locking member of the coupling body and said internal surface of said reduced diameter bore portion, the body bearing and locking member being biased into a recess of said reduced diameter bore portion, and said tubular portion of said second ferrule axially collapses within said forward region as said coupling body and collar are fully engaged in a fluid tight seal with said tubular member.

2. The coupling device of claim 1, wherein said tubular portion has an axial length that is reduced by about 10% to about 25% upon collapse.

3. The coupling device of claim 1, wherein said forward, central and rearward regions of said second ferrule each have a radial thickness and said radial thickness of said forward region is about 20% to 50% of the radial thicknesses of each of said central and rearward regions.

4. The coupling device of claim 1, wherein said tubular portion is collapsed to include an arcuate bulge that extends around the tubular portion and acts as a spring to bias the second ferrule and the first ferrule together.

5. The coupling device of claim 1, wherein said tubular portion is cylindrical.

6. The coupling device of claim 1, wherein said engagement portions provide a swaged fit and a press fit between said coupling body and collar.

7. The coupling device of claim 1, wherein said body bearing and locking member comprises a deformable annular shoulder extending radially outward from said coupling body adjacent said outer end of said opening in said coupling body, said shoulder being deformed by said reduced diameter bore portion into engagement with said first stepped portion as said first and second engagement portions are progressively engaged, and said deformed shoulder provides bearing engagement with said first stepped portion.

8. The coupling device of claim 7, wherein said reduced diameter bore portion includes said recess for receipt of said deformed shoulder as said coupling body and collar are fully engaged in a fluid tight seal with said tubular member.

* * * * *